Aug. 12, 1969 D. A. PERREAULT 3,461,227

MECHANICAL JITTER EQUALIZER

Filed Nov. 28, 1966

5 Sheets-Sheet 1

INVENTOR.
DONALD A. PERREAULT

BY [signature]

ATTORNEY

INVENTOR.
DONALD A. PERREAULT
BY [signature]
ATTORNEY

Aug. 12, 1969

D. A. PERREAULT 3,461,227

MECHANICAL JITTER EQUALIZER

Filed Nov. 28, 1966

5 Sheets-Sheet 3

INVENTOR.
DONALD A. PERREAULT

BY Anthony D. Cennamo

ATTORNEY

INVENTOR.
DONALD A. PERREAULT
BY Anthony D. Cennamo
ATTORNEY

INVENTOR.
DONALD A. PERREAULT
BY [signature]
ATTORNEY

United States Patent Office 3,461,227

Patented Aug. 12, 1969

3,461,227

MECHANICAL JITTER EQUALIZER

Donald A. Perreault, Pittsford, N.Y., assignor to Xerox Corporation, Rochester, N.Y., a corporation of New York Filed Oct. 28, 1966, Ser. No. 590,356
Int. Cl. H04n 7/00, 3/00, 3/16
U.S. Cl. 178—6 7 Claims

ABSTRACT OF THE DISCLOSURE

This invention relates to error compensating systems and, more particularly, to apparatus for electrically correcting signal jitter caused by mechanical perturbations in data scanning devices.

Background

In information transmission systems, it is important that the information be transmitted from one location to another with as little signal loss or distortion as possible. Several areas of signal distortion arise in any transmission system due to inherent imperfections and various methods for limiting the distortion effects have arisen in the prior art. Various techniques are known for the correction of amplitude or phase distortion due to transmission line characteristics.

A further cause of signal distortion could arise in a scanning system utilizing mechanical and/or optical scanners which are employed in some graphic information transmission systems. Where the system utilizes a rotating or oscillating mechanical/optical scanner, for example, to illuminate a document for detection of the reflected image information, momentary transients on the power line, increased wear of the power train, or other mechanical/optical interruptions can lead to time jitter of the electrical signals produced by such scanners. Such unwanted movement of the scanner leads to distortion of the electrical signal which cannot be compensated for at the receiver because of the unknown pattern to which the signals are distorted by the scanner. In addition, with systems utilizing a mechanical/optical scanner for readout purposes, further mechanical aberrations would lead to smeared or inaccurate readout causing deterioration in the quality in the facsimile to be reproduced.

Objects

It is accordingly an object of the present invention to compensate for errors introduced into electrical signals by the mechanical perturbations of a mechanical/optical transducer.

It is another object of the present invention to electrically correct the time jitter of electrical signals produced by non-uniform mechanical motion of data transducers which convert permanent or semi-permanent stored representations of information into electrical signals, or vice-versa.

It is another object of the present invention to correct the time jitter of electrical signals produced by mechanical/optical scanning of graphic images in a facsimile transmission system.

Brief summary of the invention

In accomplishing the above and other desired aspects, applicant has invented novel apparatus for stabilizing the effects of the mechanical vibrations causing electrical distortions in graphic information scanners. There is disclosed error correction means or generating an error signal in proportion to the deviation of the angular position of the transducer system. A multiple threshold device is provided to quantize the error position signals into discrete levels, the outputs of which are coupled to a tapped delay line. A plurality of logical AND gates are coupled to the outputs of the tapped delay line for selectively gating an output from a particular tap in response to the detected error signals. The output signal therefrom is complementary to the displacement caused by the mechanical error, thereby eliminating its effect. A similiar system is provided for a writing transducer, whereby the mechanical errors of the rotating or oscillating scanner are compensated for in a similar manner in order to equalize the effects thereof in the production of the output recorded medium.

Brief description of the drawings

For a more complete understanding of the invention, as well as other objects and further features thereof, reference may be had to the following detailed description in conjunction with the drawings wherein.

Detailed description

Figure 1:
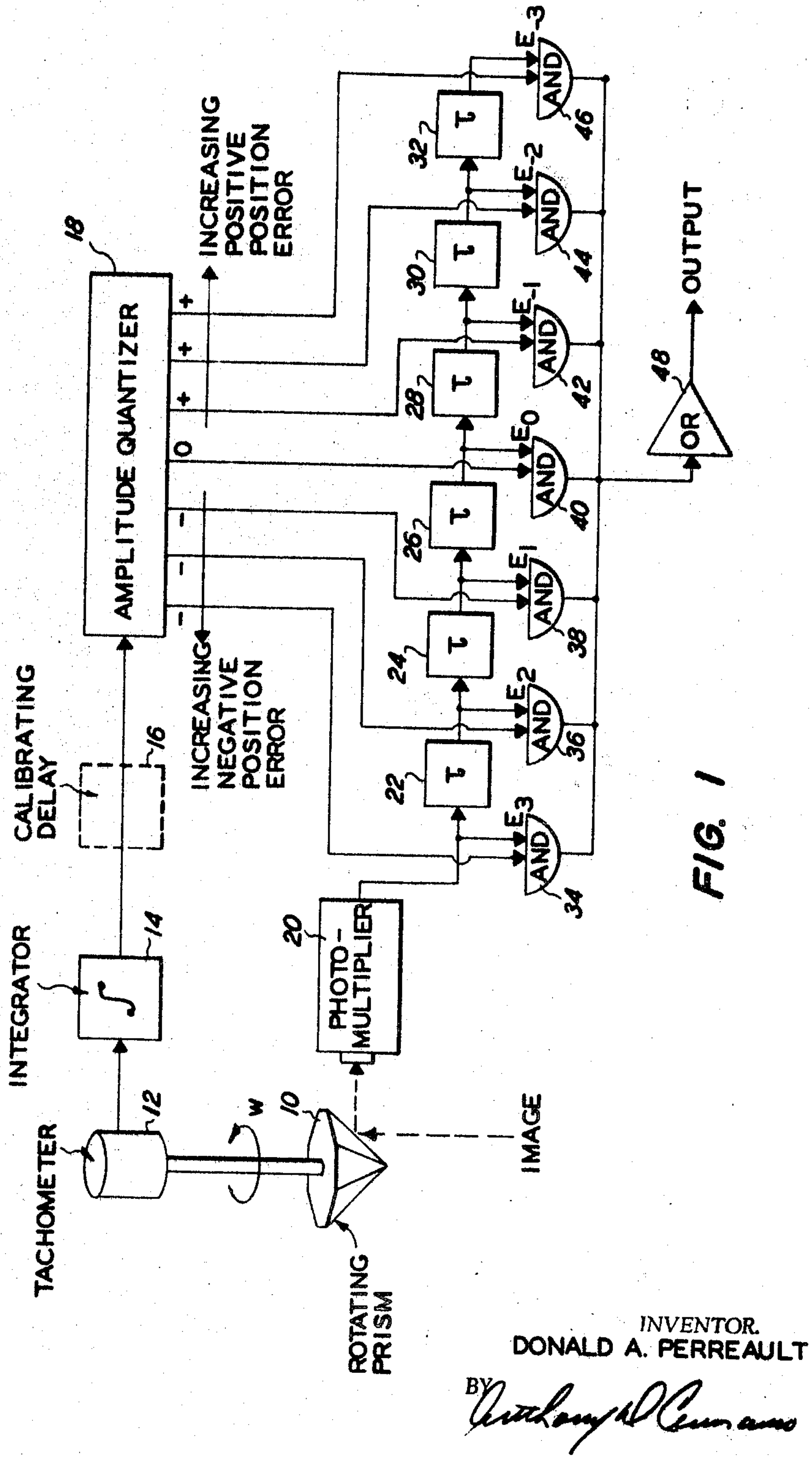
FIG. 1 is a block diagram of a facsimile system for the electrical correction of mechanically distorted electrical signals.

Referring now to FIG. 1, there is shown a system in accordance with the present invention for the electrical correction of mechanically caused error signals in a graphic scanning system. A rotating prism scanner 10, for example, is provided for causing a light ray to scan across a document in a predetermined pattern and for receiving the reflected image therefrom. The rotating prism scanner 10 is of the type disclosed in U.S. patent application Ser. No. 488,469, filed Sept. 20, 1965 and assigned to the same assignee. Such a scanner is exemplary only, however, as any rotating or oscillating type of scanner could be utilized.

The reflected image is directed from the rotating prism scanner10 into the photomultiplier 20, of any known design. The photomultiplier converts the optical signal into electrical signals representative of the information detected along the scan of the light beam. The electrical signal from the photomultiplier 20 is applied to the delay line which transmits the signals unaltered except for the time delay. Coupled to each stage of the time delay 22, 24, 26, 28, 30, and 32 are AND gates 34, 36, 38, 40, 42, 44 and 46.

A tachometer 12 detects the rate at which the rotating prism 10 is rotated by a motor, not shown. Coupled to the output of tachometer 12 is an integrator 14, of conventional design, which generates a signal level in response to the tachometer output. When the scanner rotation speed $\omega$ changes, that is, faster or slower due to the mechanical aberrations, the output signal level from the tachometer increases or decreases accordingly. The integrator 14 detects the change in signal output from the tachometer and generates the respective error position signals. The output from integrator 14 is directed to the amplitude quantizer 18, which could be an analog to digital converter; for example, a multiple threshold device to quantize the error position signals into discrete levels. The outputs from the amplitude quantizer 18 are coupled to the other inputs of AND gates 34 to 46. Coupled to the outputs of the AND gates is an OR gate 48 for transmitting the signals emanating from the jitter equalizer.

In operation, the signals from the scanner are applied to the delay line which propagate therethrough at the characteristic velocity. If the mechanical shaft velocity is constant, i.e., no deviation from the normal angular displacement has occurred, the amplitude quantizer 18 selects the center or normal output tap of the delay line and simultaneously inhibits all other taps. The output signal of the delay line is therefore the same as the input signal of the delay line but delayed a predetermined amount. The delay line output is therefore the same as the input except delayed by $$\frac{m}{2}t$$

where $m$ is the number of delay stages and $t$ is the time delay per stage.

Figure 2:
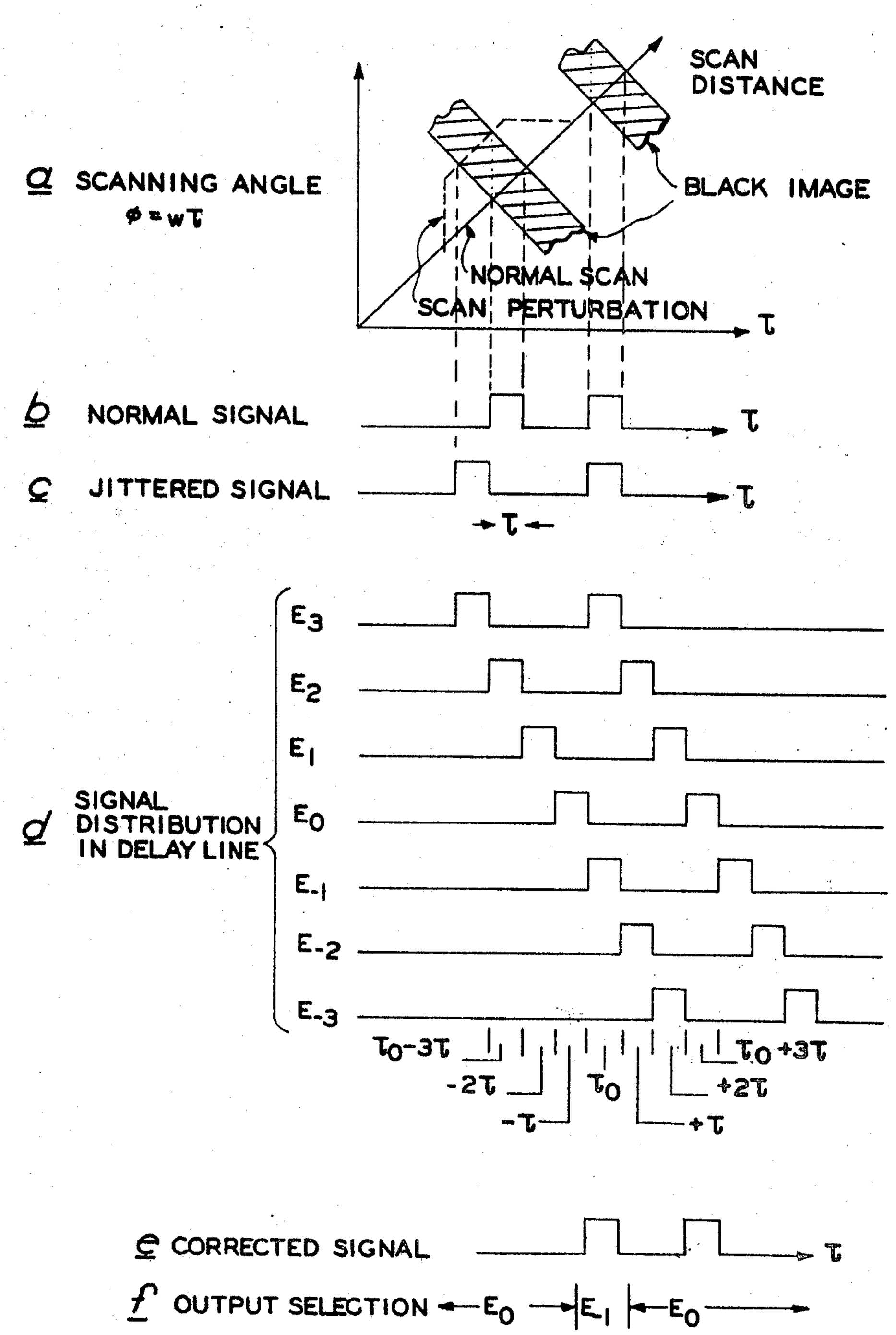
FIG. 2 shows various waveforms helpful in understanding the principles of the present invention.

If an angular displacement has caused a portion of the signal to be misplaced, as seen in FIG. 2, the output of the amplitude quantizer selects the appropriate tap to produce an increased or decreased delay of the electrical signal proportional to the detected error. With one axis being the scanning angle, $\Phi$, and the other axis being time, $t$, FIG. 2*a* shows a normal scan through black information and one that has been altered by a mechanical perturbation that is constant over a portion of the image. The normal signal from the photomultiplier would appear as FIG. 2*b*. Because of the mechanical error, it can be seen that jitter causes the electrical signal ohtput to deviate from its normal time position. The electrical signal output would pass through the various stages of the delay line, the outputs of which are seen in FIG. 2*d*. With the tachometer and integrator signal output as a reference, the amplitude quantizer 18 would enable the appropriate AND gate, thus allowing the proper delay signal to pass to the output line through OR gate 48 in FIG. 1, so as to return the jittered signal back into its normal time relation in the data waveform while the entire signal information has been delayed that predetermined amount. The corrected signal now in the proper time relation is seen in FIG. 2*e*. For the particular example shown in FIG. 2*c*, the proper delay selection in the delay line would be the $E_{-1}$ tap shown in FIG. 2*f*.

Figure 3:
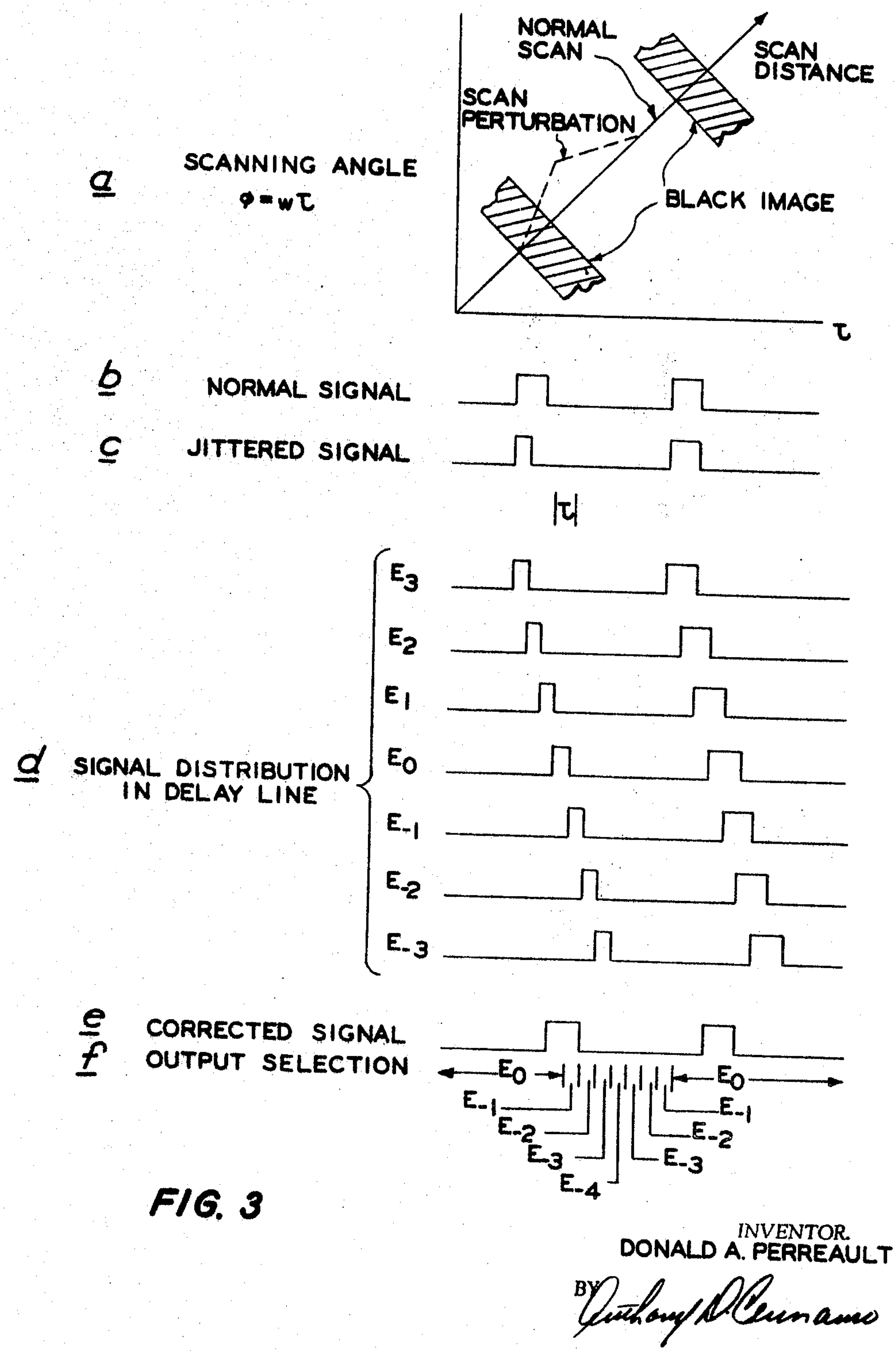
FIG. 3 shows further waveforms helpful in understanding the principles of the present invention.

With FIG. 2 showing the correction of scanning error which is constant over the portion of the image, FIG. 3 shows the scan correction error which varies over a portion of an image. If the velocity is changing through a portion of the data as is shown, the black portion will be narrower or wider than the normal. FIG. 3*a* shows the variation of the scan perturbation through the black image and FIG. 3*b* shows the normal signal therefrom, while FIG. 3*c* shows the jittered signal in accordance with the scan perturbation. To correct this signal, it is necessary for the tap selection, seen in FIG. 3*d*, to change during the period of the signal. This implies that the delay per stage, $t$, may be shorter than the duration of the minimum signal. Also, the larger the deviation of angular position from normal, the longer must be the overall delay. FIG. 2*e* shows the corrected signal therefrom, while FIG. 3*f* shows the output selection of the particular delay tap. In general, the accuracy of correction will depend on the delay per stage and the range of correction will depend on the number of stages.

The result of the procedures as hereinbefore described is an electrical signal with time representing the original spatial distribution of information to any degree of accuracy regardless of perturbations about a nominal speed in the mechanical system. It may be necessary to add a calibrating delay to one or the other branch of the circuit, as shown by the dotted lines 16 in FIG. 1 to bring the output selection into convenient time coincidence with the signal. Signal correction would take place continuously regardless of whether the image is black or white or gray as in a facsimile system providing continuous tone.

Figure 4:
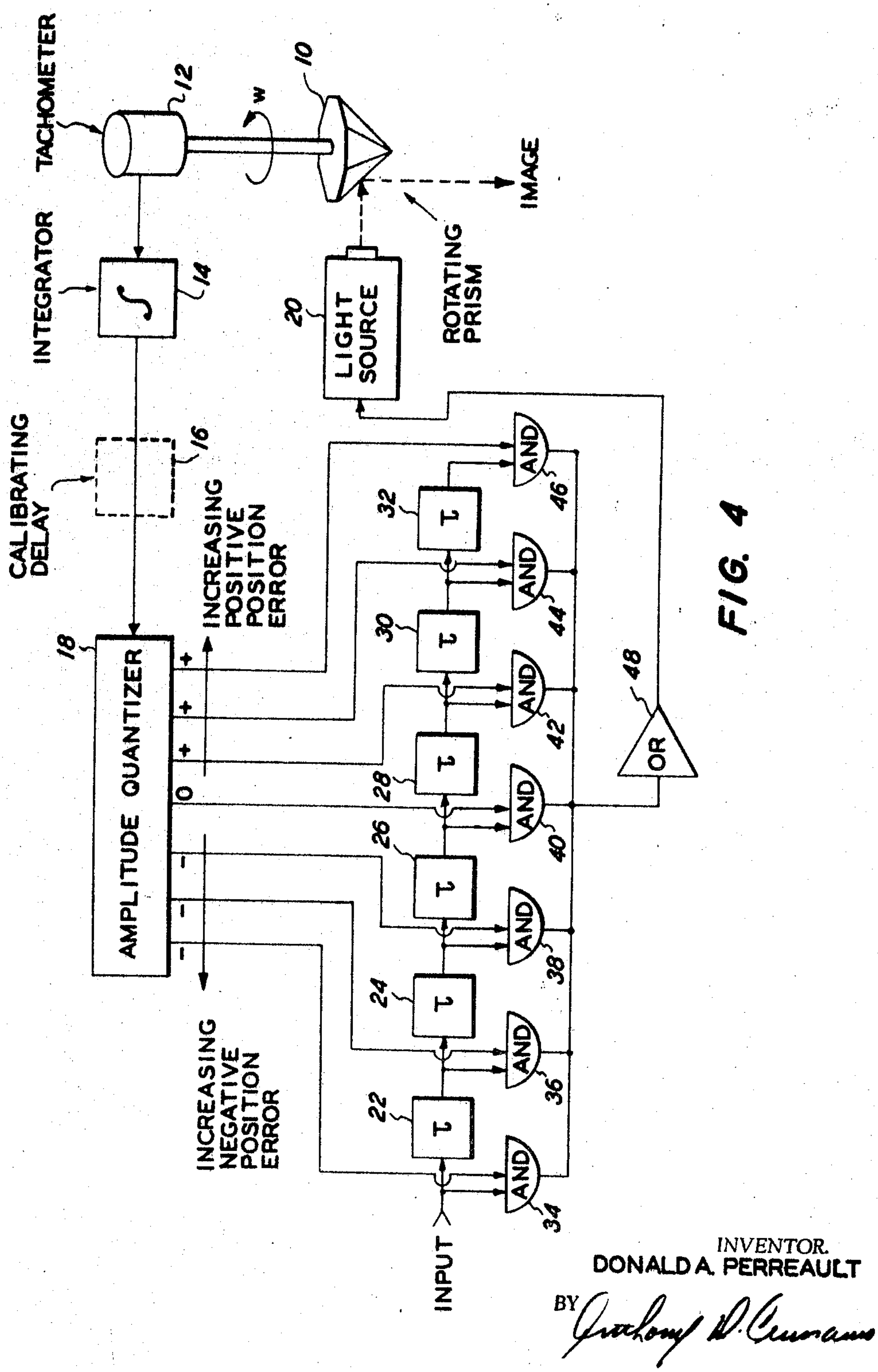
FIG. 4 is a block diagram of a data receiver in accordance with the principles of the present invention.

Referring now to FIG. 4, there is shown a system for the electrical correction of mechanically recorded signals. The structure and operation of the error correction apparatus at the receiver is very similar to that of the transmitter except that the delay line input is from the transmission line and the output gated from the delay line is applied to the printing or recording mechanism. Similar components are numbered the same as the system shown and described in FIG. 1. With the exception of light source 50, the components remain the same, lending themselves to application in a transceiver type of communication system. The control signal utilized to selectively actuate a predetermined gate associated with a tap of the delay line is derived from the mechanical portion of the receiver transducer and, as before, is arranged to cancel the mechanical perturbations, thus producing the correct spatial distribution of the electrical information signals to be converted to optical information, for example, for printout of a facsimile image.

Figure 5A:
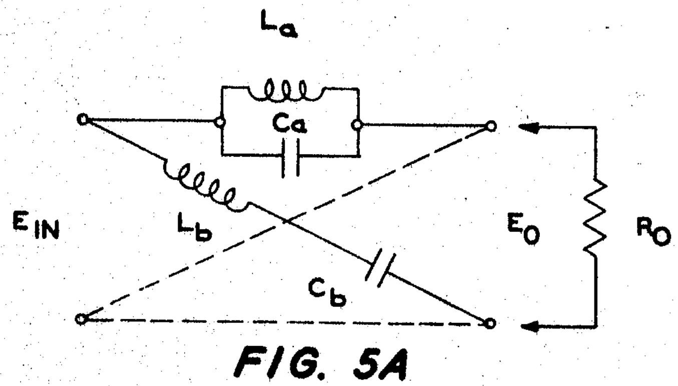
FIG. 5 shows various embodiments of the delay circuits utilized in FIGS. 1 and 4.

The delay stages in FIGS. 1 and 4, as required by this invention, must have constant delay and constant amplitude characteristics across the bandwidth occupied by teh signal spectrum; otherwise, the circuits would themselves introduce transmission distortion. Essentially distortionless delay of $t_0$ across the frequency band from zero to $f_0$, where $t_0$ equals $1/2f_0$, can be obtained with the all-pass network of the types shown in FIGS. 5*a* and 5*b*. The formulas for the separate components of the filters in FIG. 5*a*, for example, are:

$$L_a=\frac{\epsilon R_0}{\omega_0}\quad C_a=\frac{1}{\omega_0\epsilon R_0}$$

$$L_b=\frac{R_0}{\omega_0\epsilon}\quad C_b=\frac{\epsilon}{\omega_0 R_0}$$

Figure 5B:
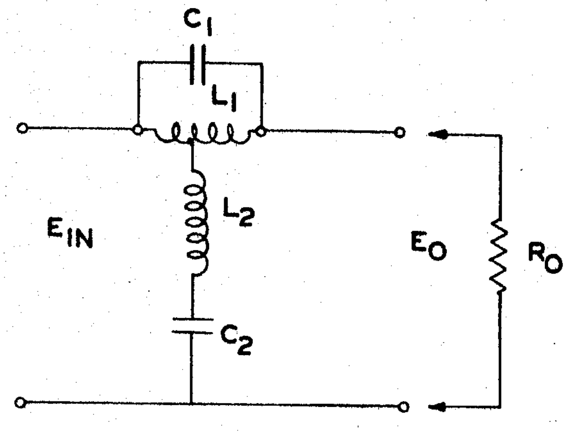

The component equations for the values in FIG. 5*b* are:

$$L_1=2L_a=\frac{2\epsilon R_0}{\omega_0}\quad C_1=\frac{C_a}{2}=\frac{1}{2\omega_0\epsilon R_0}$$

$$L_2=\frac{L_b}{2}=\frac{R_0}{2\omega_0\epsilon}\quad C_2=2C_b=\frac{2\epsilon}{\omega_0 R_0}$$

where $$\epsilon=\sqrt{\frac{L_a}{L_b}}$$

or $$\epsilon=\sqrt{\frac{C_b}{C_a}}$$

This invention does not and is not intended to correct distortions in the received electrical signal caused by non-linear phase vs. frequency or amplitude vs. frequency characteristics of the electrical transmission system. It is well known, however, that a tapped delay line with suitable gain controls can correct this type of distortion as well. In this latter case, the gain settings are static relative to the electrical signal rather than dynamically selected as disclosed in this invention.

In the foregoing there has been disclosed methods and apparatus for minimizing the distortion effects caused by mechanical perturbations in a mechanical/optical transducing system. The invention has been described in conjunction with a rotating or oscillating prism type of facsimile scanner, but it is obvious that this invention also has application in the conversion of magnetically stored information to electrical signals as in magnetic tape, drum, or disc apparatus; and in conversion of mechanically stored information to electrical signals as in conventional phonograph disc record players. The invention, in addition, has been described with a finite number of delay and gating stages, but it is apparent that a different number may be utilized as could different network designs. While the error detecting apparatus was disclosed to be a tachometer and a quantizing circuit, other means of measuring angular position error could be utilized, as, for example, shaft mounted code discs. While the present invention, as to its objects and advantages, as described herein, has been set forth in specific embodiments thereof, they are to be understood as illustrative only and not limiting.

What is claimed is:

1. In an information scanning system including a transducer angularly moving about an axis with respect to a scan medium, an electrical equalizer for correcting signal errors caused by mechanical perturbations of said transducer comprising:
means for generating error signals in accordance with the deviations from the normal angular movement of said transducer;
means for producing a data waveform in response to the information detected by said transducer;
means coupled to said producing means for selectively delaying said data waveform; and
gating means coupled to said delay means and said generating means for selectively gating a predetermined output from said delay means in response to the detected error signals.

2. A device as set forth in claim 1 wherein:
said angularly moving transducer comprises an optical scanning means for optically scanning and receiving information modulated light rays from a document;
said generating means includes means for amplitude quantizing said error signals into discrete level signals;
said producing means comprises a photomultiplier tube for producing an electrical signal waveform in response to the information modulated light rays detected by said optical scanning means; and,
said delaying means comprises a plurality of delay means serially connected to said photomultiplier means.

3. A device as set forth in claim 2 wherein:
said error signal generating means comprises an integrating circuit,
and wherein said quantizing means comprises a multi-threshold circuit means for generation of said discrete level signals,
said signals above a predetermined level indicating an increasing positive position error, and wherein said signals below that of said predetermined level indicating an increasing negative position error,
said gating means comprising an AND gate circuit coupled to each discrete signal output from said amplitude quantizing means, said outputs from said amplitude quantizing means selectively enabling said AND gates to time orient said data waveform displaced by said deviation from the normal angular velocity of said transducer means after delay in said delaying means.

4. An electrical equalizer comprising:
an information scan medium;
transducer means angularly moving about an axis with respect to said scan medium for detection of the information thereon;

means coupled to said transducer means for generating a signal proportional to the angular velocity of said transducer means;
error generating means for generating eror signals in proportion to the deviations from the normal angular position of said transducer means;
amplitude quantizing means for quantizing said error signals into signals of discrete levels;
means coupled to said transducer means for producing a data waveform in response to the information detected by said transducer means;
a plurality of delay means serially coupled to said detection means; and
gating means coupled to each of said plurality of delay means and responsive to the output therefrom and from said amplitude quantizing means for selectively gating a predetermined output from said delay line means to time orient said data waveform displaced by said deviations from the normal angular velocity of said transducer means.

5. A method of correcting time jitter in electrical data signals caused by mechanical perturbations of a transducer angularly moving about an axis, comprising the steps of:
monitoring the angular rotation velocity of said transducer;
generating error signals in accordance with the deviations from the normal angular rotation of said transducer; and
transmitting the data signals in the proper time relation according to the relative displacement of the error signal.

6. The method as defined in claim 5 wherein the step of monitoring includes
generating an electrical velocity signal in proportion to the angular rotational velocity of said transducer; and
wherein the step of generating error signals includes integrating said angular rotational velocity signal to obtain said error signals, and
amplitude quantizing said error signals into discrete level signals.

7. The method as set forth in claim 6 wherein the step of transmitting includes
delaying said electrical data signals by predetermined time sequences, and
gating said data signals after predetermined delay time sequences in response to the discrete level signals generated in accordance with said deviation from the normal angular rotation.

References Cited

UNITED STATES PATENTS

| | | | |
|---|---|---|---|
| 2,897,373 | 7/1959 | Lesti | 350—7 |
| 3,316,348 | 4/1967 | Hufnagel et al. | 350—7 |

RALPH D. BLAKESLEE, Primary Examiner

B. LEIBOWITZ, Assistant Examiner

U.S. Cl. X.R.

178—7